United States Patent [19]
Lynde et al.

[11] Patent Number: 4,938,291
[45] Date of Patent: Jul. 3, 1990

[54] CUTTING TOOL FOR CUTTING WELL CASING

[76] Inventors: Gerald D. Lynde; James M. Price, both c/o Tri-State Oil Tool Industries, Inc., P.O. Drawer 5757, Bossier City, La. 71111-5757

[21] Appl. No.: 272,466

[22] Filed: Nov. 17, 1988

Related U.S. Application Data

[60] Division of Ser. No. 927,512, Nov. 6, 1986, Pat. No. 4,887,668, which is a continuation-in-part of Ser. No. 816,287, Jan. 6, 1986, Pat. No. 4,796,709.

[51] Int. Cl.⁵ .............................................. E21B 29/00
[52] U.S. Cl. ...................... 166/55.8; 82/1.5; 408/145; 408/180
[58] Field of Search ............ 166/55.6, 55.7, 55.8; 82/1.5; 408/144, 145, 150, 157, 158, 180, 188, 236, 237, 703; 409/143

[56] References Cited
U.S. PATENT DOCUMENTS 3,195,636  7/1965  Cordary et al. ............ 166/55.8
4,710,074  12/1987 Springer ....................... 408/200

Primary Examiner—Z. R. Bilinsky
Attorney, Agent, or Firm—Dodge Bush & Moseley

[57] ABSTRACT

A cutting tool (22) having elongate cutter arms (36) mounted about a pivot pin (40) for outward swinging movement. Cutting blades (58, 60) are mounted on the lower ends of the cutter arms (36) and have a plurality of closely fitting hard carbide cutting elements (90) secured thereto and forming an inclined leading planar cutting surface (82) inclined from the upper end of the associated blade (58, 60) at an angle A between one (1) degree and twenty (20) degrees relative to the direction of rotation. The cutting elements (90) have parallel rear and front faces (90A, 90B) connected by a peripheral side surface (90C) extending perpendicularly to the parallel faces (90A, 90B). Several embodiments of pivotally mounted cutter arms (36, 36A, 36B, and 36C) are illustrated including various blades (58, 60, 58F, 60F, 116, and 114) having a plurality of closely fitting cutting elements arranged thereon in a plurality of longitudinally and transversely extending rows for forming the leading inclined planar cutting surface.

8 Claims, 7 Drawing Sheets

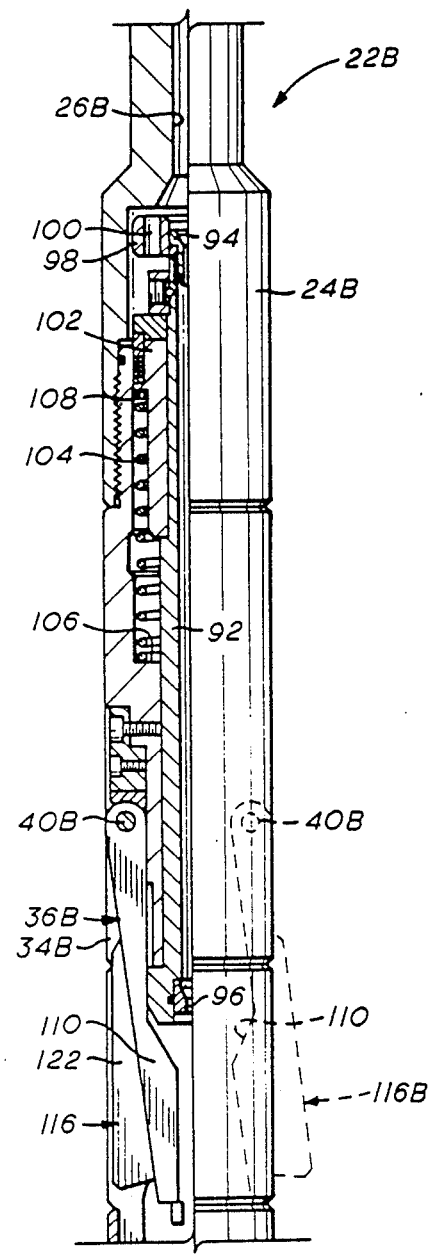
FIG. 14
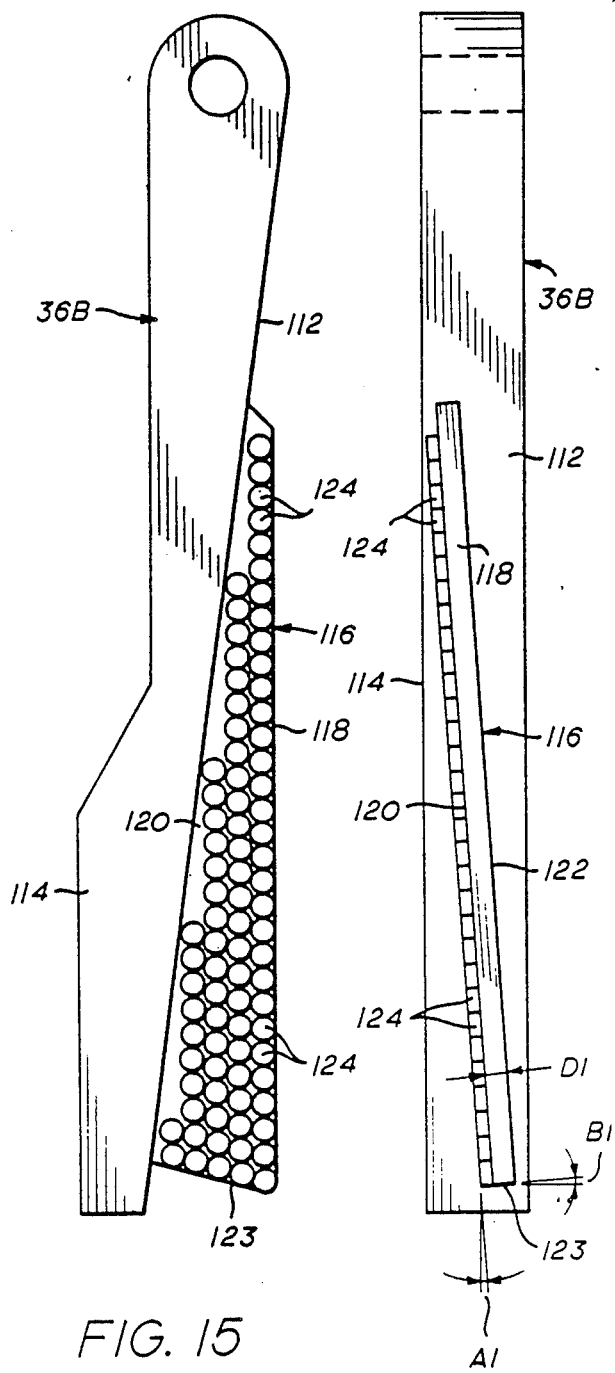
FIG. 15
FIG. 16

CUTTING TOOL FOR CUTTING WELL CASING

CROSS REFERENCE TO RELATED APPLICATION

This application is a division of application Ser. No. 927,512 filed Nov. 6, 1986, U.S. Pat. No. 4,887,668, which is a continuation-in-part of application Ser. No. 816,287 filed Jan. 6, 1986.

BACKGROUND OF THE INVENTION

The invention relates generally to an improved cutting tool having radially expandable cutter arms for cutting well casing, and more particularly to improved cutting blades on the outer end of the radially expandable cutter arms for engaging the inner periphery of the well casing in cutting relation.

Heretofore cutting tools have been provided for cutting the inner periphery of well casing and having a cutter body with cutter arms pivotally mounted within slots in the cutter body for movement in a radial direction between a retracted position for lowering the tool within the well casing, and a radially expandable extended position in cutting contact with the inner periphery of the well casing. The lower end portions of the cutter arms have also been formed heretofore with blades having cemented carbide cutting fragments or chips secured thereto and forming the cutting edge.

For example, U.S. Pat. No. 3,331,439 dated July 18, 1967, shows a cutting tool having pivotally mounted cutter arms thereon with blades on the lower ends thereof formed with hard cutting material embedded therein. Likewise, U.S. Pat. No. 2,859,943 dated Nov. 11, 1958 shows a cutting tool for well casing having pivoted outer arms with cutter blades thereon having embedded carbide cutting fragments or chips for forming the cutting surface. U.S. Pat. No. 3,195,636 dated July 20, 1965 shows a similar cutting tool with a pivoted cutter arm and a matrix material bonded to the cutting face of the arm and having embedded cutting elements.

Prior cutting tools such as shown in the above patents, when utilized for cutting a well casing, such as a forty-eight (48) inch diameter casing having a wall thickness of one and one-half (1½) inch, for example, have required around four or five hours in which to complete the cutting operation.

SUMMARY OF THE PRESENT INVENTION

Application Ser. No. 816,287 discloses a cutting tool which is utilized generally with milling tools for cutting and removal of casing progressively from the upper end of the casing and employs cutting blades having their lower ends tilted rearwardly relative to their upper ends in the direction of rotation. A plurality of hard carbide cutting elements are secured to the leading surfaces of the blades and form planar cutting surfaces.

The present invention is particularly directed to an improved cutting tool mounted for rotation within a well for cutting and/or milling existing casing previously installed in the well and having cutter arms mounted for pivotal movement between a retracted position for being lowered in the well and a radially expandable cutting position for engaging adjacent casing in a cutting relation. As used in the specification and claims herein, the term "casing" shall be interpreted to include pipe, tubing, liners, and other similar tubular members installed within a well.

The improved cutting tool of the present invention has improved cutting blades on the outer ends of the radially expandable cutter arms with such cutting blades having a leading planar cutting surface with respect to the axis of rotation of the tool to define a cutting and/or milling edge at its radially outermost surfaces, the lower end of the leading planar cutting surface both inclined rearwardly with respect to the respective upper end of the leading planar cutting surface thereby to present an inclined cutting surface engaging the casing in cutting relation. The base of the blade has a plurality of hard carbide cutting elements or inserts mounted thereon in closely fitting relation to each other in a plurality of adjacent rows to form the planar cutting surface, and both the blade base and the carbide inserts are progressively worn away from their outermost surfaces as the cutting operation progresses. The hard carbide inserts which are of a rectangular cross section have generally parallel planar front and rear faces and the side surface between the front and rear faces are inclined with respect to the rotational axis of the cutting tool to provide a so-called negative rake thereby to increase the cutting effectiveness and efficiency of the cutting blades during the cutting operation.

It is noted that the side surfaces between the planar front and rear faces of the inserts extend at right angles or perpendicularly to the planar faces. Thus, upon the forward tilting of the upper end of the blade with respect to the direction of rotation, the side or circumferential surface of the inserts are tilted an amount with respect to the direction of rotation the same as the amount of tilting or inclination of the planar leading surface of the blade. Further, the plurality of hard carbide cutting elements, such as cylindrical discs, are arranged in staggered rows on the leading face, to present a minimum bearing surface against the casing while allowing the relatively small staggered carbide discs or cutting elements to continually expose a fresh cutting edge as the cutting operation progresses thereby to perform the cutting action in a minimum of time. As an example, utilizing the present invention with a pair of parallel spaced cutting blades on each of the cutter arms, a forty-eight (48) inch diameter casing having a wall thickness of one and one-half (1½) inches was cut in less than one hour as compared with previous cutting tools and cutting methods taking around four (4) hours or more in which to complete the cutting operation.

One embodiment of this invention is directed to a radially expanding cutter arm having a reversible blade on its end including generally parallel planar leading surfaces so that upon wear of the leading surface, the blade may be removed from the cutter arm and reversed (rotated 180°) with the initial trailing surface then becoming the new leading surface upon reversal thereby to present a new cutting surface to the casing being cut. Such a reversible blade increases the life of the blade particularly when the blades are tilted or inclined with respect to the rotational axis of the cutting tool.

It is an object of the present invention to provide a cutting tool having improved cutting blades for cutting well casing in a minimum of time and having an increased cutting life thereby to minimize replacement of the blades.

An additional object is to provide such improved radially expanding cutter arm utilized with so-called section mills in which a casing section is cut and milled to form a "window" for removal of a desired portion of the casing.

It is a further object of this invention to provide such improved cutting blades on the outer ends of radially expandable cutter arms with the blades having planar leading cutting surfaces which are inclined rearwardly from top to bottom with respect to the direction of rotation thereby to provide an efficient and effective cutting action against the casing to be cut.

An additional object of this invention is to provide such an improved cutting blade having a plurality of hard carbide cutting elements or inserts mounted in closely fitting relation to each other in adjacent rows on the leading face of the blade to form a leading planar cutting surface. The inserts have generally parallel planar front and rear faces with their rear faces secured to a blade base and their front faces forming the planar cutting surface. The circumferential side surface of the inserts between the parallel faces extends along a longitudinal axis generally at right angles to the planar cutting surface and being of a relatively small diameter thereby to continually present sharp edges from adjacent successive carbide inserts as the carbide inserts are progressively worn away from their radially outermost surfaces as the cutting operation continues. The hard carbide inserts are secured such as by brazing to the adjacent surface of the blade and form the cutting edge which digs or bites into the inner peripheral surface of the surrounding casing to be cut.

Other objects, features and advantages of this invention will become more apparent after referring to the following specification and drawings.

BRIEF DESCRIPTION OF DRAWINGS

FIG. 14 is an elevational view, partly in section, of a further embodiment of a cutting tool of this invention in which expanding cutter arms are pivotally mounted on a combined cutting and milling tool for first cutting the casing and then milling away a casing section progressively from the upper annular end of the cut casing;

FIG. 15 is a side elevation of a radially expandable cutter arm of the embodiment in FIG. 14 shown removed from the cutting tool;

FIG. 16 is an end elevation of the radially expandable arm shown in FIG. 15 showing the leading cutting surface of the blade inclined rearwardly from its upper end with respect to the direction of rotation;

DESCRIPTION OF THE INVENTION

Figure 1:
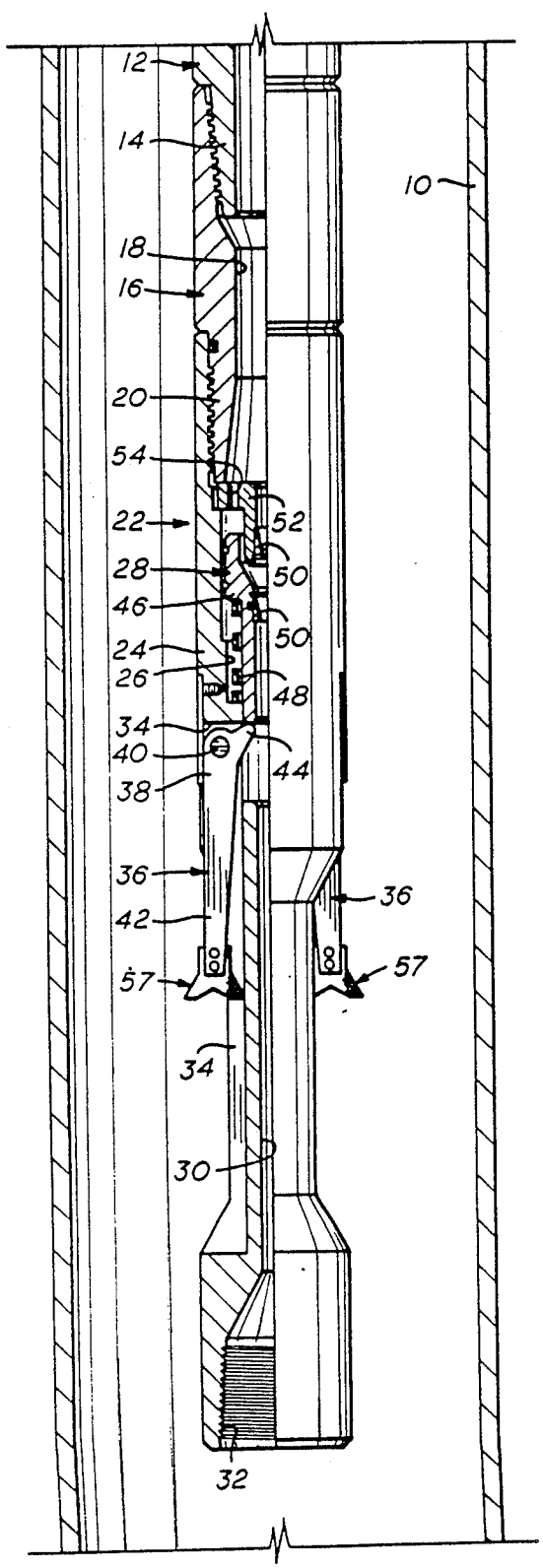
FIG. 1 is longitudinal sectional view, partly in elevation, showing a cutting tool comprising one embodiment of the present invention positioned within a well casing with pivotally mounted cutter arms shown in a radially retracted position for being lowered within the well casing for engaging the inner periphery of the casing.
Figure 2:
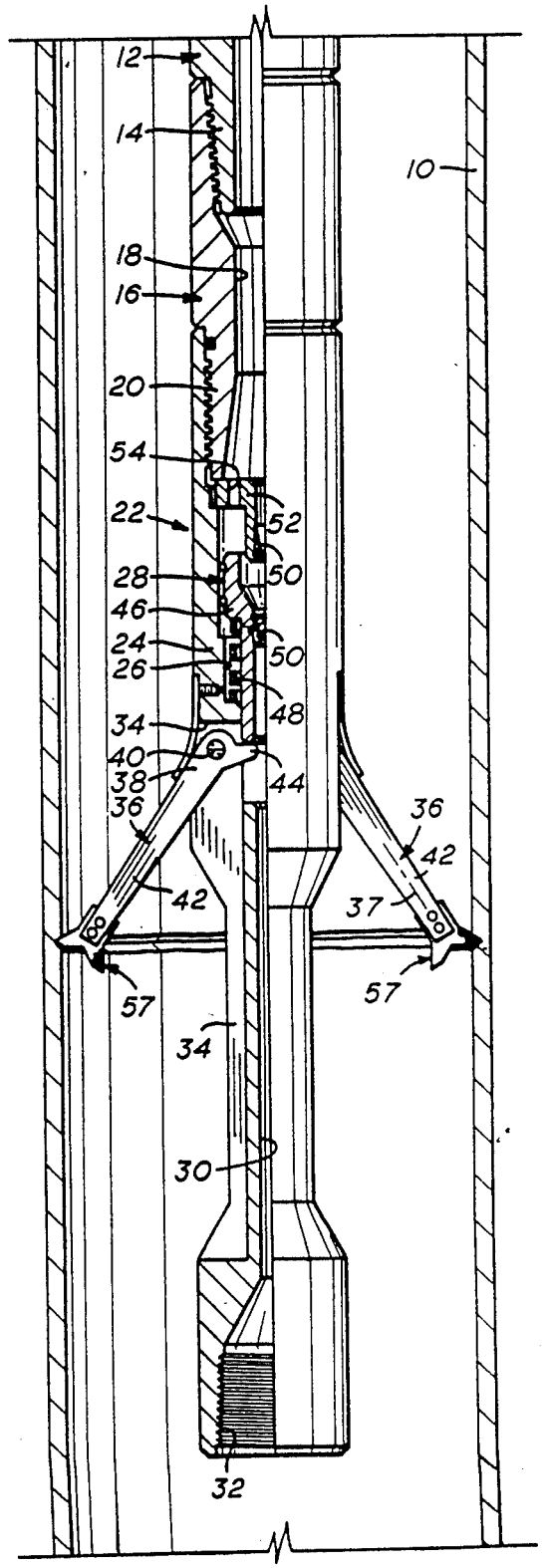
FIG. 2 is a fragmentary view of FIG. 1 but showing the cutting tool with its pivotally mounted cutter arms in a radially expanded position with cutting blades thereon in cutting contact with the inner periphery of the casing.
Figure 3:
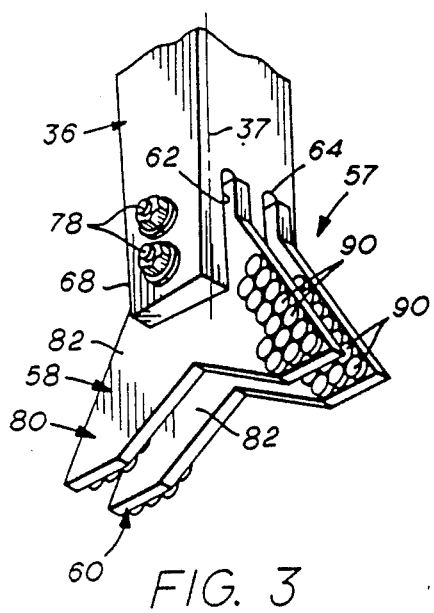
FIG. 3 is a perspective view of the lower end of the cutter arm showing the improved cutter blades mounted thereon.
Figure 4:
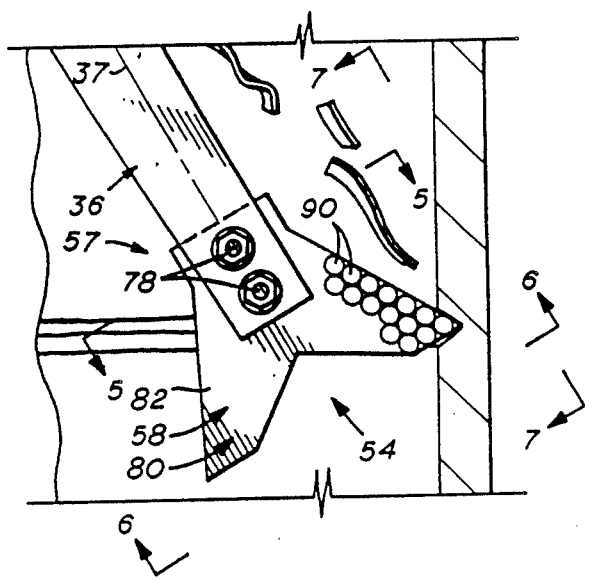
FIG. 4 is a front elevation showing the leading planar surface of the blade mounted on the lower end of the cutter arm in cutting contact with the inner periphery of a casing to be cut.
Figure 5:
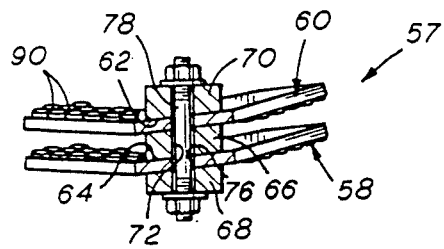
FIG. 5 is a section taken generally along line 5—5 of FIG. 4.

Referring now to the drawings for a better understanding of this invention, and more particularly to FIGS. 1 and 2, a well casing is shown at 10. A drill string is indicated generally at 12 and has its lower threaded end 14 in threaded engagement with the upper end of an upper sub 16 defining a central bore 18 to receive drilling fluid through drill string 12 from a surface location. A lower threaded end 20 of upper sub 16 is received in threaded engagement within the upper end of a cutting tool generally indicated at 22.

Cutting tool 22 has a tubular cutter body 24 forming a central bore 26 in which fluid pressure responsive means indicated generally at 28 is housed and is responsive to flowing drilling fluid from drill string 12 for hydraulic actuation as will be explained further. Cutting tool 22 has a lower reduced diameter portion 30 with a lower internally threaded end 32. Three longitudinally extending slots 34 are circumferentially spaced about the periphery of tubular cutter body 24 adjacent reduced diameter portion 30 and receive elongate cutter arms 36 of a generally rectangular cross-section having a longitudinal axis 37. Each elongate arm 36 has an upper end portion 38 pivotally mounted by a pin 40 to cutter body 24 and a lower downward extending end portion 42. A tang or extension 44 extends upwardly from upper end portion 38. Elongate arms 36 are free for pivoting between the retracted position shown in FIG. 1 for lowering within casing 10, and a radially expanded or extended position as shown in FIG. 2 in which lower end portions 42 of arms 36 are swung or moved radially outwardly into cutting contact with the periphery of casing 10 to be cut.

Figure 11:
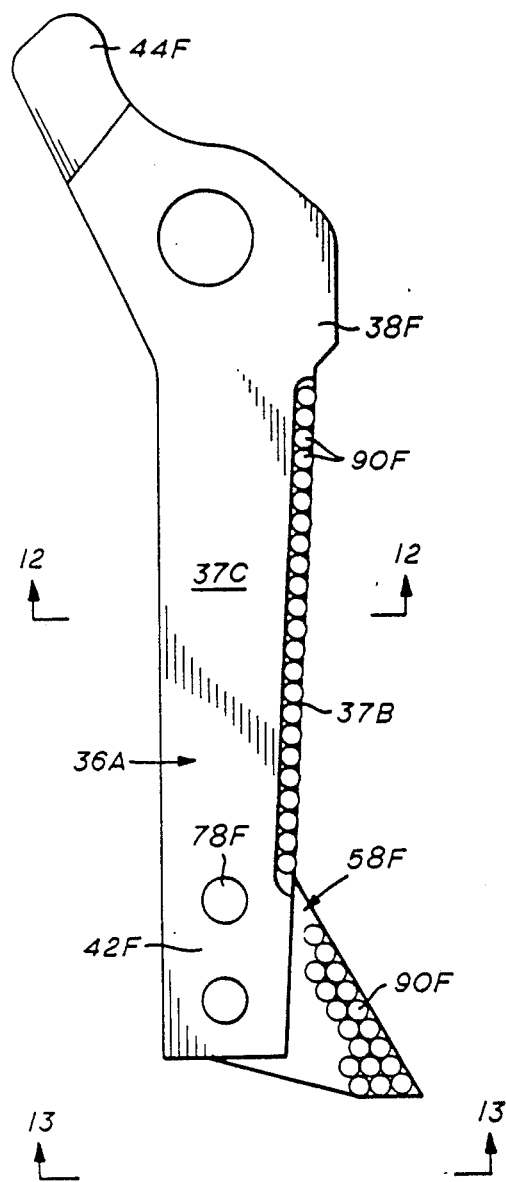
FIG. 11 is a front elevation of another embodiment of the invention showing a modified cutter arm and blade particularly adapted for cutting a plurality of concentric casing strings.
Figure 12:
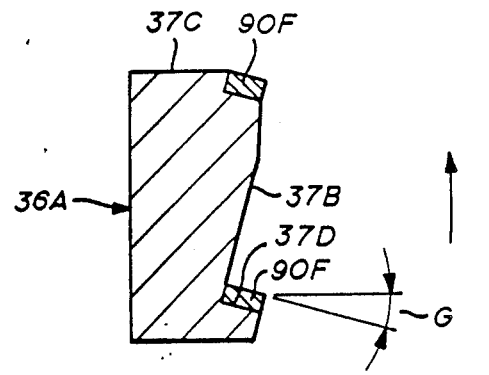
FIG. 12 is a section taken generally along line 12—12 of FIG. 11.
Figure 13:
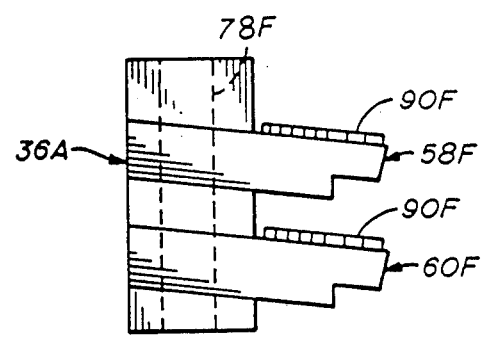
FIG. 13 is a bottom plan of the modified cutter arm looking generally along line 13—13 of FIG. 11.

Wells may have several concentric casing strings which are to be cut so that the length of arms 36 and the amount of pivotal movement is preselected depending on the number and spacing of concentric casing strings to be cut. The embodiment of the invention shown in FIGS. 1-10 is particularly adapted for cutting a single casing string, but the embodiment shown in FIGS. 11-13 is adapted for cutting a plurality of concentric casing strings, if desired. In the cutting of a single casing string the cutting operation is normally accomplished in a single trip within the well by directing drilling fluid under pressure from the surface through well string 12 and by rotating well string 12 and cutting tool 22 with cutter arms 36 pivoted into a radially expanded position into cutting contact with the periphery of casing 10 to be cut. The pivotal connections between arms 36 and cutter body 24 are designed so that the connections are sufficient to transmit the torque required to accomplish the cutting of casing 10.

For moving lower end portions 42 of cutter arms 36 radially outwardly into expanded cutting engagement with casing 10, fluid pressure responsive means generally indicated at 28 includes a piston 46 mounted within cutter body 24 and continuously urged upwardly by spring 48. A pair of spaced flow restrictions or orifice rings are provided at 50 and are sized to provide a restriction to the downward flow of drilling fluid. An indicator 52 adjacent upper orifice ring 50 has a plurality of ports 54 therein and when a predetermined fluid pressure differential is reached, piston 46 moves downwardly contacting tangs 44 to pivot cutter arms 36 outwardly radially into cutting engagement with casing 10. When cutter arms 36 are pivoted outwardly to radially extended position in contact with casing 10, a decreased fluid pressure differential is indicated at the surface so that an operator is aware that cutter arms 36 are in expanded cutting engagement with the inner periphery of casing 10 to be cut.

Forming an important part of this invention is the improved cutting blade assembly indicated at 57 mounted on the lower end of each cutter arm 36. Cutter blade assembly 57 includes a pair of substantially identical blades 58 and 60. For the purposes of simplification, the same numerals for similar elements of blades 58 and 60 are employed. Cutter arm 36 has a pair of slots or grooves 62 and 64 formed in the end of lower end portion 42. Grooves 62 and 64 define a pair of contiguous bifurcations which form a common center prong or finger 66 and a pair of end prongs or fingers 68 and 70 on opposite sides of finger 66. Fingers 66, 68 and 70 have transversely aligned openings 72 therein. Blades 58 and 60 have shanks 74 received within grooves 62 and 64 and a pair of openings 76 in shanks 74 are transversely aligned with openings 72 in fingers 66, 68, and 70. Suitable nut and bolt combinations generally indicated at 78 are received within transversely aligned openings 72 and 76 for securing blades 58 and 60 within slots 62 and 64.

Each blade 58, 60 has a base 80 having a planar front face or surface 82 and a generally parallel planar rear face or surface 84. Front surface 82 forms a leading surface facing the direction of rotation and surface 84 forms a trailing surface with respect to the direction of rotation. Blade 58 diverges from shank 74 to form a generally triangular shape as viewed in front elevation looking at planar front face 82 and has radially spaced inner and outer apices 86 and 88 defining inner and outer surfaces. The radially outermost surface formed by apex 88 defines the cutting edge engaging the inner periphery of casing 10 in cutting relation.

With respect to the longitudinal axis 37 of elongate arm 36, blade 58 has an upper end 58A, a lower end 58B, an inner sloping side 58C, and an outer sloping side 58D. Outer side 58D is positioned adjacent the casing 10 to be cut. Lower end 58B has a portion thereof cutaway or notched to form notched surfaces 58E.

Figure 6:
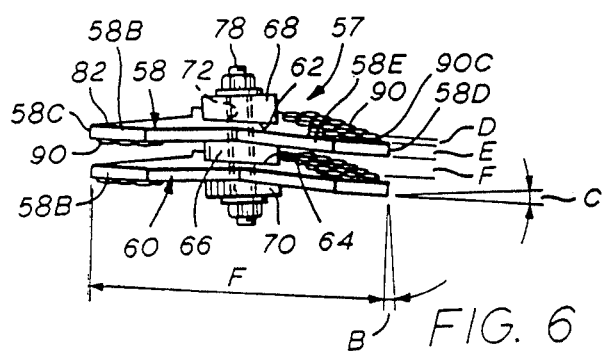
FIG. 6 is a bottom plan view of the cutter blade forming the present invention looking generally along line 6—6 of FIG. 4.
Figure 7:
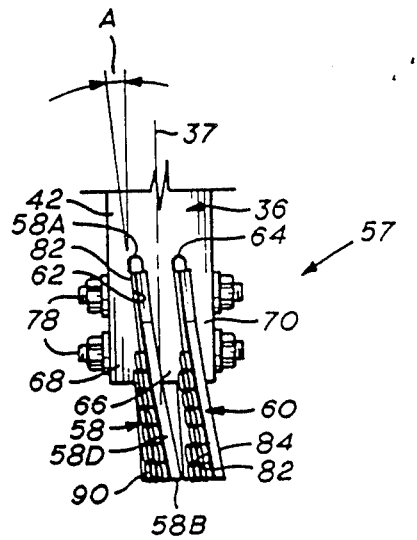
FIG. 7 is a side elevation of the cutter blades forming the present invention looking generally along line 7—7 of FIG. 4.
Figure 8:
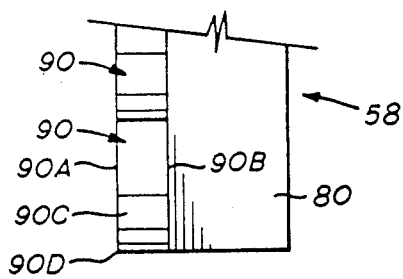
FIG. 8 is an enlarged side elevational view of a cylindrical carbide disc mounted on the base of the cutter blade.
Figure 9:
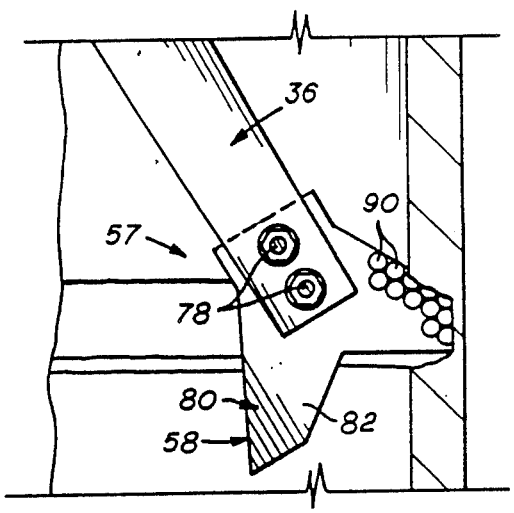
FIG. 9 is a front elevation view similar to FIG. 4 but showing the cutter blades in a worn condition.
Figure 10:
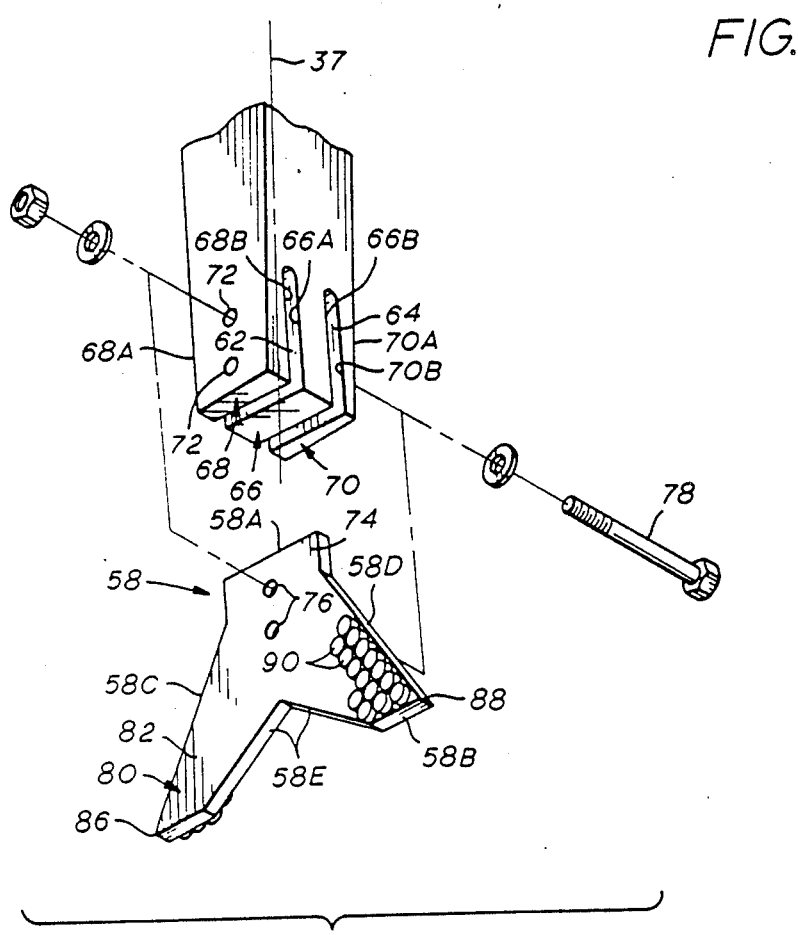
FIG. 10 is an exploded view showing the lower end of the cutter arm and a blade removed from the cutter arm with the carbide discs forming the planar cutting surface of the blade.

Referring particularly to FIGS. 6, 7, and 10, finger 68 defines an outer surface 68A and an inner surface 68B, finger 70 defines outer surface 70A and inner surface 70B and center finger 66 defines opposed surfaces 66A and 66B. With respect to the radially outermost side of arm 36, finger 68 tapers upwardly and finger 70 tapers downwardly to provide an increased thickness of finger 68 at its lower end and a decreased thickness of finger 70 at its lower end. With respect to the direction of rotation the lower end 58B of blade 58 is tilted rearwardly with respect to upper end 58A at an angle A as shown in FIG. 7. Angle A is of an optimum around five (5) degrees with an optimum range between around one degree (1°) and fifteen (15) degrees. Under certain conditions of use, an angle A as high as twenty (20) degrees will function adequately.

Mounted on planar leading surface 82 adjacent apex 88 and on planar trailing surface 84 adjacent apex 86 are a plurality of hard carbide cutting elements or inserts comprising cylindrical carbide discs or buttons 90 secured by suitable brazing or the like to the planar faces 82 and 84 of base 80. Inserts or discs 90 are preferably arranged in staggered rows extending from apexes 86 and 88 with the outer two rows having, for example, seven and six discs, respectively, as shown generally in FIG. 2. A third row has two discs 90 therein. A disc 90 which has been found to function in a satisfactory matter has a thickness of three-sixteenths (3/16) inch, a diameter of three-eighths (⅜) inch, and is sold under the name "Sandvik S6" by the Sandvik Company, located in Houston, Tex.

Each cylindrical disc 90 has a front face 90A which forms a cutting face for leading face 82 and an opposed rear face 90B which is flush with supporting base 80 and brazed thereto. A cylindrical surface 90C connects faces 90A and 90B and extends along a line or longitudinal axis at right angles to the planar front and rear faces 90A and 90B. An annular cutting edge 90D formed at the juncture of front face 90A and cylindrical surface 90C digs or bites into the inner peripheral surface of casing 10 in cutting relation as shown in FIG. 2. The lower portion of annular cutting edge 90D for the lower half of disc 90 includes a lowermost intermediate portion and opposed side portions inclined upwardly from the intermediate portion. Front faces 90A of discs 90 form the leading cutting surfaces on blade 58 and extend at angle A with respect to the axis of rotation as shown in FIG. 7 thereby to provide a negative rake for faces 90A and annular cutting edges 90D. As a result of the tilting of the leading cutting surface of blades 58 and 60 with lower ends 58B rearwardly of upper ends 58A with respect to the direction of rotation, the cylindrical or annular surface 90C of each disc 90 has its longitudinal axis arranged at an angle B with respect to the transverse axis of elongate arm 36. Angle B is equal to angle A since annular surface 90C extends along a longitudinal axis at right angles to faces 90A and 90B. Thus, the sharp annular cutting edge 90D is presented to the inner periphery of casing 10 to be cut during the initial contact of carbide discs 90 with casing 10. It is to be understood that any void areas formed between discs 90 will be filled in during the bracing operation, such as with a nickel silver compound. Thus, a relatively smooth uninterrupted planar leading cutting surface is provided by the plurality of discs 90.

When the cutting operation is commenced with an unused or new carbide disc 90, a sharp edge 90D initially contacts the inner periphery of the casing to be cut. Upon wear of blades 58, 60 as the cutting operation progresses, successive carbide discs 90 and cutting edges 90D are continually presented to the inner periphery of casing 10 since discs 90 with annular cutting edges 90D are staggered in three rows and the wear continues progressively from the radially outermost surfaces of blades 58 and 60. The sharp cutting edge 90D of disc 90, not the entire width of cylindrical surface 90C, is initially in contact with casing 10 since surface 90C has a negative rake as defined by angle B.

Referring particularly to FIG. 6, outer side 58D of blade 58 is positioned rearwardly of inner side 58C with respect to the direction of rotation as indicated at angle C and this likewise tilts cylindrical surface 90C of disc 90 so that a greater portion of annular cutting edge 90D of disc 90 is presented at an angle with respect to casing 10. Angle C is preferably the same as angles A and B.

Hard carbide disc 90 has a thickness indicated at D in FIG. 6 of three-sixteenths (3/16) inch. The thickness of base 80 of blade 58 is shown at E in FIG. 7 and is preferably around three-eighths (3/8) inch thick or around two (2) times the thickness of disc 90. Generally, a thickness of base 80 from around two (2) to four (4) times the thickness of insert or disc 90 will function satisfactorily. In order to minimize any drag resulting from blade 58 contacting casing 10, the material from which blade 58 is formed is of a mild steel having a Brinell hardness range of around one hundred forty-five (145) with an optimum Brinell hardness range of between around one hundred thirty (130) and one hundred sixty (160). The carbide discs 90 have a Rockwell A hardness of around eighty-five (85) to eighty-eight (88) which is around seven to nine times harder than the material from which blade 58 is formed. For satisfactory results, it is believed that disc 90 should be at least around three (3) times harder than blade 58.

Casing 10 to be cut has a Brinell hardness of around two hundred (200) and carbide discs 90 are around five (5) times harder than casing 10. As a result of base 80 being formed of a material several times as soft as the carbide discs 90, the wear flat surface formed as base 80 is worn away generates a minimum of friction which permits minimum torque for rotation of drill string 12 and cutting tool 22. The spacing indicated at F in FIG. 6 between blades 58 and 60 should be an amount sufficient to receive adequately the turnings or cuttings during the cutting operation generated by forward blade 58 with respect to the axis of rotation. A spacing F of around one-half (1/2) inch has been found to function effectively.

It is noted that discs 90 are provided adjacent both inner side 58C of blade 58 as well as outer side 58D. Discs 90 adjacent inner side 58C are inoperable during the cutting operation and are used only upon reversal of blade 58 after wear of outer side 58D. Blades 58 and 60 are reversed after removal of the cutting tool 22 from the well and inner sides 58C then become outer sides 58D. Blades 58 and 60 are reversed generally after around one (1) inch of wear.

As a specific but non-limiting example, in which the embodiment of the present invention shown in FIG. 1-10 was used to cut a casing forty-eight (48) inches in diameter and having a wall thickness of one and one-half (1½) inches, blades 58 and 60 were arranged at angles A, B and C of around five (5) degrees. A torque of around five thousand (5000) foot pounds was utilized and a rotational speed of around 120 RPM was provided with fluid pressure of around 500–600 psi. Test results on several different cutting operations have been obtained for cutting a forty-eight (48) inch diameter casing in less than one hour.

While inserts 90 have been illustrated as cylindrical discs, it is to be understood that other shapes of inserts 90 would function satisfactorily such as inserts of a square, rectangular, or triangular shape, for example. It is desirable, however, that cutting inserts have parallel planar rear and front faces with circumferential side surfaces between the parallel faces extending at right angles to the parallel faces.

Referring to FIGS. 11–13, another embodiment of a cutter arm forming the present invention is shown which is particularly adapted for cutting multiple concentric casing strings. Cutter arm 36A has an upper end portion 38F with an extension 44F thereon and a lower end portion 42F. Blades 58F and 60F are mounted on the lower end of arm 36A by nut and bolt combinations 78F in a manner similar to arms 58 and 60 of the embodiment of FIGS. 1–10 and have carbide discs 90F arranged thereon in a plurality of generally transverse rows staggered horizontally as shown in FIG. 11. Blades 58F and 60F are not illustrated as being reversible but, if desired, blades 58F, 60F could be made reversible as in the embodiment of FIGS. 1–10. For cutting through multiple casing strings, cutter arm 36A must project outwardly a maximum amount and might engage more than one casing string simultaneously. For this purpose, it is desirable to have a substantial length of elongate cutter arm 36A provided with a cutting surface.

As shown particularly in FIG. 12, the outermost surface 37B of elongate arm 36A has a leading row of carbide cutting elements or inserts illustrated as discs 90F along leading surface 37C and a generally parallel trailing row of discs 90F mounted on an inset seat 37D of surface 37B. Carbide discs 90F have their outer planar faces extending at an angle G with respect to the direction of rotation which is the same as angle C of the embodiment of FIGS. 1–10 and provides a negative rake for contacting the adjacent casing string. Carbide discs 90F are identical to carbide discs 90 shown in the embodiment of FIGS. 1–10.

Referring to FIGS. 14–16, another embodiment of the invention is illustrated for utilization particularly for cutting and milling casing within a well bore. The cutting and milling tool illustrated generally at 22B is particularly adapted for cutting and milling a casing section to form a "window" for removal of a predetermined length of the casing. The cutting and milling tool 22B includes expandable cutter arms 36B to move between expanded and retracted positions at selected depths and the tool is often referred to as a "section mill". A so-called section mill is particularly used in a sidetracking operation for sidetracking an existing bore hole.

As shown in FIG. 14, cutting and milling tool shown at 22B having a tubular cutter outer body 24B and a central bore 26B which receives pressurized fluid from a surface location. Mounted within tubular body 24B is a mandrel 92 having respective upper and lower nozzles 94 and 96 forming flow restrictions. An orifice ring 98 adjacent the upper end of mandrel 92 has a plurality of circumferentially spaced orifices 100 to receive drilling fluid therethrough. A piston 102 is secured to the outer periphery of mandrel 92 for movement therewith. A spring 104 is biased between a shoulder 106 forming a stop on body 24B and a shoulder 108 on piston 102 for continuously urging mandrel 92 to an upper position.

Body 24B has a plurality of longitudinal extending slots 34B spaced about its circumference. Mounted in each slot 34B is a cutter arm 36B pivotally mounted about pivot pin 40B secured to body 24B. Cutter arm 36B has a cam surface 110 formed on its inner rear surface and upon downward movement of mandrel 92, the lower end of mandrel 92 engages cam surface 110 to cam cutter arm 36B outwardly about pivot pin 40B into cutting engagement with the adjacent casing. The inner periphery of the casing is first engaged in a cutting operation for horizontally cutting the casing and thereafter the upper annular end of the casing is progressively milled or chipped away as is well known in the art for removal of a predetermined casing section.

Referring now to FIGS. 15 and 16 in which cutter arm 36B is shown removed from milling tool 22B, the radially outermost surface of cutter arm 36B is shown at 112 and the leading surface of cutter arm 36B with respect to the axis of rotation is shown at 114. Mounted on radially outermost surface 112 is a cutter blade generally indicated at 116 including a base 118 having a leading planar face 120 and a rear trailing face 122 with respect to the axis of rotation of cutter tool 22B. Base 118 has a lower end surface at 123. Rows of hard carbide cutting inserts or discs 124 are mounted on the planar leading face 120 of base 118 and form a leading planar cutting face for blade 116. Each disc 124 is identical to the disc 90 shown in the embodiment of FIGS. 1-10.

Blade 116 has its lower end 123 inclined rearwardly with respect to the axis of rotation and the upper end of blade 116. An angle A1 as shown in FIG. 16 illustrates the inclination of blade 116 and an angle A1 of between around three (3) degrees and five (5) degrees has been found to be optimum. An angle A1 of between around one (1) degree and ten (10) degrees is believed to function satisfactorily and under certain conditions it is believed that an angle A1 as high as twenty (20) degrees would function. Disc or insert 124 has planar parallel rear and front faces with a circumferential surface between the faces extending at right angles thereto and arranged at an angle B1 with respect to the transverse axis of elongate arm 36B which is of the same magnitude as angle A1. Thus, a negative rake is provided by lower end surface 123 and the leading planar cutting surface upon rotation of milling tool 22B. The thickness D1 of base 118 is around three-eighths (⅜) inch which is around twice the thickness of the associated discs 124 which is preferably around three-sixteenths (3/16) inch in thickness. Base 118 has a thickness preferably of around two (2) to four (4) times the thickness of the associated discs 124. The hardness of base 118 is similar to that for the embodiment shown in FIGS. 1-10.

During the initial cutting operation, the radially outermost edge of blade 116 engages the inner periphery of the adjacent casing to cut the casing wall thereat. After the casing wall has been cut, a desired section or length of casing is removed by progressively milling or chipping away of the upper annular end of the casing formed by the horizontal cut until the desired casing section has been removed.

Referring now to FIGS. 17-20, an additional embodiment of a so-called section mill of this invention is illustrated in which pivotally mounted cutter arms are utilized cutting blades and cutting inserts of the present invention.

Figure 17:
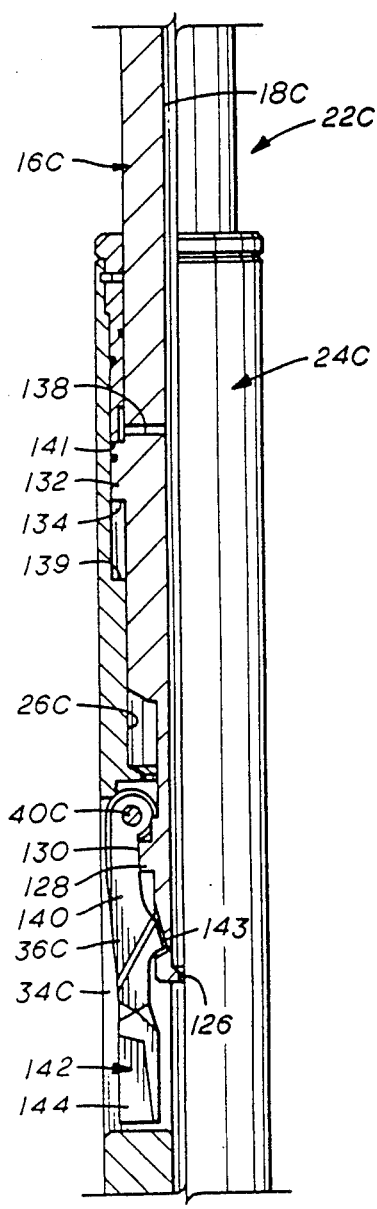
FIG. 17 is side elevation, partly in section, showing an additional embodiment of a cutting tool of this invention in which a combined cutting and milling tool is illustrated having a plurality of blades mounted on the lower end of a cutter arm and showing the cutter arms in a retracted position.
Figure 18:
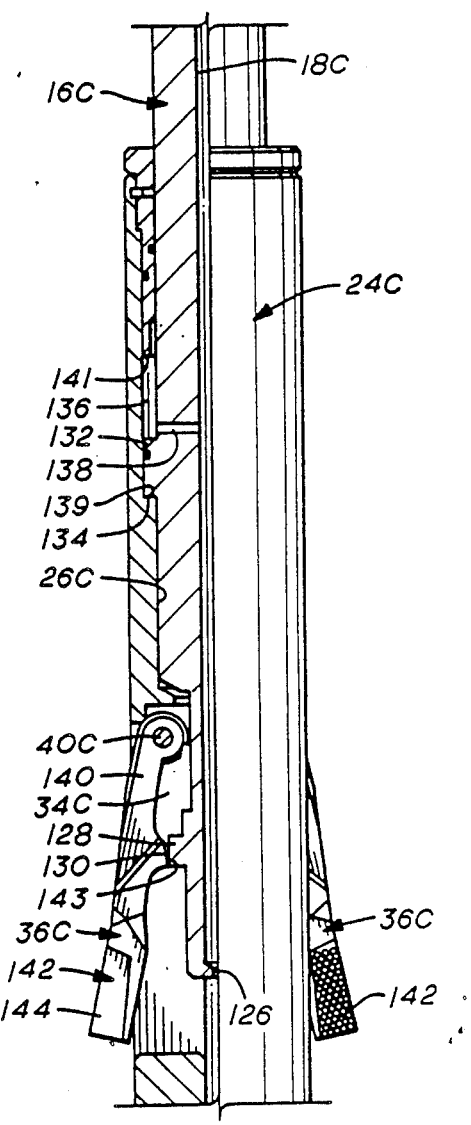
FIG. 18 is a view of the embodiment shown in FIG. 17 but showing the cutter arms in a radially expanded position.
Figure 19:
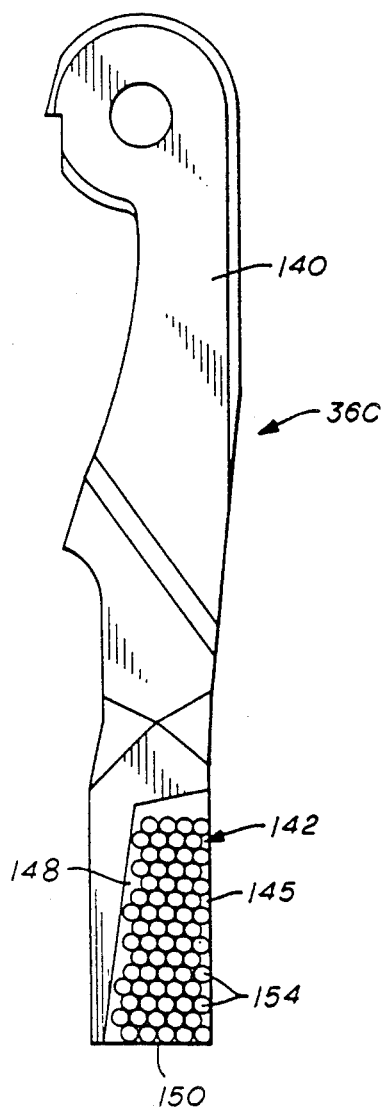
FIG. 19 is an enlarged side elevation view of a cutter arm removed from the cutting tool of FIG. 18 and showing a plurality of cutting blades forming the present invention.

As shown in FIGS. 17 and 18, a mandrel or kelly is shown at 16C and has a central bore 18C. Mandrel 16C is adapted to be connected to a suitable drill string for operation and control from a surface location. A tubular cutter body is shown generally at 24C and has a central bore 26C receiving the lower end portion of mandrel 16C. Cutter body 24C is mounted for longitudinal axial movement relative to mandrel 16C.

Mandrel 16C includes a lower annular nozzle 126 forming a choke. A lower annular extension or enlargement 128 on mandrel 16C forms an outer annular cam surface 130 thereon. An upper annular extension or enlargement 132 on mandrel 16C forms a piston and has a lower shoulder 134 defining a stop for cutter body 24C. A piston chamber 136 is provided above piston or annular extension 132 and a fluid port 138 supplies fluid to piston chamber 136 for upward relative movement of body 24C relative to mandrel 16C upon circulation of fluid pressure applied through bore 18C from a surface location. Body 24C has an inner shoulder 139 which provides an abutting surface for piston 132 to act as a stop for the expanded position of cutter arms 36C shown in FIG. 18. Likewise inner shoulder 141 acts as a stop to limit the downward relative movement of body 24C in the retracted position of cutter arms 36C shown in FIG. 17.

Figure 20:
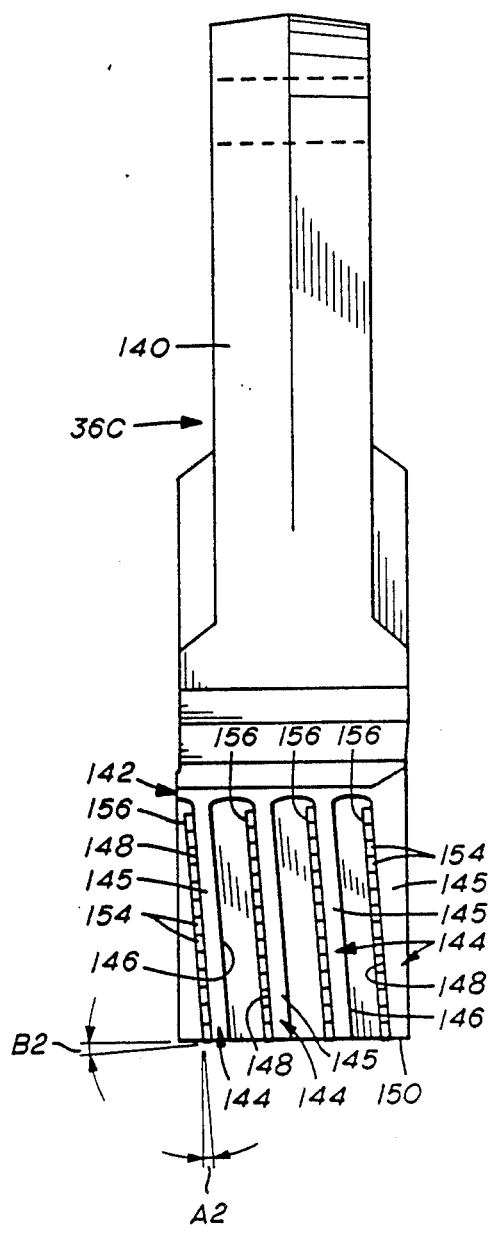
FIG. 20 is an end elevation of the cutter arm shown in FIG. 19.

Cutter body 24C has a plurality of slots 34C formed therein and cutter arms generally designated 36C are mounted within slots 34C for pivotal movement about pivot pins 40C. Cutter arm 36C has an upper shank 140 and a lower blade head 142 thereon as shown particularly in FIGS. 19 and 20, a cam surface 143 is provided on the rear inner surface of arms 36C. Blade head 142 has a plurality of blades 144 thereon arranged in generally parallel relation to each other and spaced from each other around three-fourths (¾) inch, for example. Each blade 144 has a base 145 having a trailing rear face 146 and a leading front face 148. The lower ends of blades 144 are shown at 150 and form a lower end surface for riding along the upper annular end of a casing to be milled or chipped away progressively from the casing end. Rows of staggered inserts or discs 154 are mounted on the front planar leading face 148 of each blade 144 and define a leading planar cutting surface at 156 and a lower cutting edge or surface along the lower end surface 150 of blades 144. Blades 144 and inserts 154 are identical in dimension to corresponding discs and blades set forth for the embodiment of FIGS. 1-10. Likewise, angles A2 and B2 shown on FIG. 20 are identical to angles A and B for the embodiment of FIGS. 1-10. The leading planar cutting surface 156 formed by discs 154 is arranged at an angle A2 with respect to the longitudinal axis of cutting tool 22C. Each insert or disc 154 has an outer cylindrical surface which presents an annular cutting edge extending at angle B2 with respect to the transverse axis of cutting arm 36C as set forth in the embodiment of FIGS. 1-10 for disc 90. Angle B2 is equal to angle A2 and provides a negative rake resulting from a tilting of the planar leading surface 148 of associated blade 144.

In operation for the embodiment shown in FIGS. 17-20, during the run-in of mandrel 16C, cutter arms 36C are in the position shown in FIG. 17 as fluid pressure in bore 18C is dampened. When desired to expand arms 36C, circulation fluid pressure is applied to bore 18C and fluid pressure through port 138 to fluid chamber 136 moves body 24C to the position of FIG. 18 relative to mandrel 16C in which shoulder 139 contacts piston 132. Upon such upward movement of body 24C, cam surface 130 on mandrel 16C engages inner cam surface 143 on arm 36C and cam arm 36C radially outwardly to the expanded cutting position shown in FIG. 18. In this position, cutter arms 36C are locked in place and stay in locked position as long as fluid pressure or drilling weight is applied. To return cutter arms 36C to retracted position as shown in FIG. 17, fluid pressure may be reduced and mandrel 16C raised. In this position, cam surface 130 on mandrel 16C will be moved upwardly relative to cooperating cam surface 143 on arm 36C and arm 36C will return to the position shown in FIG. 17. Thus, circulation pressure of the fluid is employed only to move cutter arms 36C to an open expanded position and the drilling weight maintains cutter arms 36C in an open position. There is no requirement for a continuous or constant fluid pressure from a fluid pump. Further, there are no springs employed for urging the cutter arms outwardly or for the return of the cutter arms to a retracted position as the arms can be retracted merely by a lifting of mandrel 16C.

It is to be understood that the cutting inserts illustrated for all of the embodiments of this invention may be of a shape other than a cylindrical shape as shown specifically in the drawings and yet function in a satisfactory manner. For example, inserts of a square, rectangular, or triangular shape would function adequately. It is desirable, however, that such cutting inserts have generally parallel front and rear planar faces with the circumferential side surfaces between the parallel faces extending at right angles to the faces.

While several embodiments of the present invention have been illustrated in detail, it is apparent that modifications and adaptations of the embodiments shown will occur to those skilled in the art. However, it is to be expressly understood that such modifications and adaptations are within the spirit and scope of the present invention as set forth in the following claims.

What is claimed is:

1. A cutting tool mounted for rotation within a well for cutting a casing therein during rotation and comprising:

a tubular cutter body having a longitudinally extending slot therein and adapted to be connected to a well string for being lowered within a well and being surrounded by casing to be cut;

an elongate cutter arm received within said slot having a leading side in the direction of rotation for forming a cutting surface and an outer side adjacent the inner periphery of the casing;

means on the cutter body mounting the upper end portion of said cutter arm in said slot for pivotal movement to permit the outward swinging movement of said cutting surface into cutting contact with the inner periphery of the adjacent casing to be cut;

means associated with said cutting tool and selectively actuated at a predetermined well depth to move the lower end of the arm outwardly for said cutting surface to engage the casing in a cutting operation;

a plurality of cutting elements positioned at the juncture of the leading side and outer side of said elongate cutter arm to define said cutting surface and extending in a row having a longitudinal axis generally parallel to the longitudinal axis of the elongate cutter arm, said cutting elements comprising a plurality of hard carbide inserts having parallel rear and front planar faces, said rear planar faces secured to the elongate arm with the outer planar leading faces of the inserts having a negative rake to present a sharp outer cutting edge to said casing; and a separate cutting blade mounted on the lower end of said elongate arm and having a plurality of hard carbide cutting inserts thereon forming a cutting surface.

2. A cutting tool as set forth in claim 1 wherein a second row of cutting elements is mounted on the outer side of said elongate arm in generally parallel spaced relation to said first mentioned row of cutting elements.

3. A cutting tool as set forth in claim 1 wherein a pair of generally parallel blades are mounted in spaced relation on the lower end of said arms and each blade has a plurality of hard carbide inserts thereon forming a leading planar cutting surface with respect to the longitudinal axis of rotation of said cutting tool.

4. A cutting tool mounted for rotation within a well for cutting a casing therein during rotation and comprising:

a tubular cutter body having a longitudinally extending slot therein and adapted to be connected to a well string for being lowered within a well and being surrounded by casing to be cut;

an elongate cutter arm received within said slot having a leading side in the direction of rotation for forming a cutting surface and a radial outermost side adjacent the inner periphery of the casing;

means on the cutter body mounting the upper end portion of said cutter arm in said slot for pivotal movement to permit the outward swinging movement of said cutting surface into cutting contact with the inner periphery of the adjacent casing to be cut;

means associated with said cutting tool and selectively actuated at a predetermined well depth to move the lower end of the arm outwardly or said cutting surface to engage the casing in a cutting operation; and a first row of cutting elements positioned at the juncture of the leading side and outer side of said elongate cutter arm to define the cutting surface and extending for a major portion of the length of said elongate cutter arm in a direction generally parallel to the longitudinal axis of the elongate cutter arm, said cutting elements comprising a plurality of inserts arranged in a closely fitting relation to each other for forming said first row, said inserts having generally parallel rear and front planar faces;

said radial outermost side of said elongate arm having a stepped elongate surface thereon spaced from and extending in a generally parallel relation to said first row of cutting elements and a second row of cutting elements mounted on said stepped elongate surface.

5. A cutting tool as set forth in claim 4 wherein a separate cutting blade is mounted on the lower end of said elongate arm and extends radially outwardly of said arm, and a plurality of hard carbide inserts are mounted on said blade for forming a cutting surface.

6. A cutting tool mounted for rotation within a well for cutting a casing therein during rotation and comprising:
   a tubular cutter body having a longitudinally extending slot therein and adapted to be connected to a well string for being lowered within a well and being surrounded by casing to be cut;
   an elongate cutter arm received within said slot having a leading side in the direction of rotation for a cutting surface and an outer side adjacent the inner periphery of the casing for forming a cutting surface at the juncture of the leading and outer sides;
   means on the cutter body mounting the upper end portion of said cutter arm in said slot for pivotal movement to permit the outward swinging movement of said cutting surface into cutting contact with the inner periphery of the adjacent casing to be cut;
   means associated with said cutting tool and selectively actuated at a predetermined well depth to move the lower end of the arm outwardly for said cutting surface to engage the casing in a cutting operation;
   a plurality of cutting elements extending in a longitudinal row for a major portion of the length of said elongate arm along the juncture of the leading side and outer side of said elongate cutter arm to define said cutting surface; and
   a separate blade mounted on the lower end of said elongate arm having a plurality of cutting elements thereon extending in a generally transverse row for forming an additional cutting surface.

7. A cutting tool mounted for rotation within a well for cutting a tubular member therein during rotation and comprising:
   a tubular cutter body having a longitudinally extending slot therein and adapted to be connected to a well string for being lowered within a well and being surrounded by the tubular member to be cut;
   an elongate cutter arm received within said slot having a leading side in the direction of rotation for a cutting surface and an outer side adjacent the inner periphery of the tubular member for forming a cutting surface at the juncture of the leading and outer sides;
   means on the cuter body mounting the upper end portion of said cutter arm in said slot for pivotal movement to permit the outward swinging movement of said cutting surface into cutting contact with the inner periphery of the adjacent tubular member to be cut;
   means associated with said cutting tool and selectively actuated at a predetermined well depth to move the lower end of the arm outwardly for said cutting surface to engage the tubular member in a cutting operation;
   a plurality of cutting elements extending longitudinally of the elongate arm in a longitudinal row for a major portion of the length of said elongate arm along the juncture of the leading side and outer side of said elongate cutter arm to define said cutting surface; and
   said arm including a laterally extending blade portion on the lower end of said elongate arm having a plurality of cutting elements thereon extending in a generally transverse row for forming an additional cutting surface.

8. A cutting tool as set forth in claim 7 wherein each of said cutting elements includes a lower cutting edge having a lowermost intermediate portion and adjacent opposed side portions inclined upwardly from said intermediate portion to continually present a relatively sharp cutting edge to the casing.

* * * * *